US012069417B2

(12) United States Patent
Je et al.

(10) Patent No.: US 12,069,417 B2
(45) Date of Patent: *Aug. 20, 2024

(54) ELECTRONIC DEVICE

(71) Applicant: LG ELECTRONICS INC., Seoul (KR)

(72) Inventors: Yongjun Je, Seoul (KR); Youngin Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,914

(22) Filed: Apr. 21, 2023

(65) Prior Publication Data

US 2023/0254617 A1 Aug. 10, 2023

Related U.S. Application Data

(63) Continuation of application No. 17/702,538, filed on Mar. 23, 2022, now Pat. No. 11,665,458, which is a continuation of application No. 17/106,664, filed on Nov. 30, 2020, now Pat. No. 11,310,577, which is a continuation of application No. 16/378,112, filed on Apr. 8, 2019, now Pat. No. 10,959,000, which is a (Continued)

(30) Foreign Application Priority Data

Feb. 7, 2014 (KR) ........................ 10-2014-0014385

(51) Int. Cl.

*H04R 1/02* (2006.01)
*H04R 1/28* (2006.01)

(52) U.S. Cl.

CPC ............ *H04R 1/028* (2013.01); *H04R 1/025* (2013.01); *H04R 1/2811* (2013.01); *H04R 1/2857* (2013.01); *H04R 2499/15* (2013.01)

(58) Field of Classification Search

CPC ...... H04R 1/028; H04R 1/025; H04R 1/2811; H04R 1/2857; H04R 2499/15

See application file for complete search history.

(56) References Cited

U.S. PATENT DOCUMENTS 6,463,160 B1 10/2002 Tracy ..................... H04R 1/025 381/386
7,724,912 B2 5/2010 Tracy ..................... H04R 9/022 381/397

(Continued)

FOREIGN PATENT DOCUMENTS

CN 101170311 A 4/2008
EP 1703766 A2 9/2006

(Continued)

OTHER PUBLICATIONS

Y. Masahiro: "Translation WO2006JP306170, A Speaker System and Display Device", XP-055251176, Oct. 5, 2006.

*Primary Examiner* — Jason R Kurr

(74) *Attorney, Agent, or Firm* — Bryan Cave Leighton Paisner LLP

(57) ABSTRACT

Disclosed herein is an electronic device. In an embodiment, the electronic device may include a body, a display combined with the front of the body, and a speaker assembly embedded on at least one side of the body, wherein the speaker assembly may include a casing configured to form an external appearance and a speaker unit combined with the casing and configured to have at least part of an element of the speaker assembly exposed to an outside of the casing.

22 Claims, 5 Drawing Sheets

Related U.S. Application Data continuation of application No. 16/013,738, filed on Jun. 20, 2018, now Pat. No. 10,299,022, which is a continuation of application No. 14/614,021, filed on Feb. 4, 2015, now Pat. No. 10,028,044.

(56) References Cited

U.S. PATENT DOCUMENTS

| | | | | |
|---|---|---|---|---|
| 7,894,620 | B2 | 2/2011 | Yang | H04R 1/021 381/345 |
| 9,509,938 | B2 | 11/2016 | Onogi | |
| 2004/0218779 | A1 | 11/2004 | Fukuyama et al. | |
| 2005/0168958 | A1 | 8/2005 | Finney et al. | |
| 2005/0190941 | A1 | 9/2005 | Yang | |
| 2006/0098838 | A1 | 5/2006 | Yoo | H04R 1/06 381/398 |
| 2006/0280329 | A1 | 12/2006 | Soga | |
| 2007/0223741 | A1 | 9/2007 | Seaberg | |
| 2007/0223747 | A1 | 9/2007 | Torisaki et al. | |
| 2007/0242848 | A1 | 10/2007 | Yang | |
| 2010/0272307 | A1 | 10/2010 | Okumura | |
| 2011/0019855 | A1 | 1/2011 | Lee et al. | |
| 2011/0026744 | A1 | 2/2011 | Jankovsky et al. | |
| 2012/0177238 | A1 | 7/2012 | Enamilo et al. | |
| 2012/0219170 | A1 | 8/2012 | Tracy | H04R 1/025 381/332 |
| 2013/0016863 | A1 | 1/2013 | Liu et al. | |
| 2013/0101152 | A1 | 4/2013 | Chen | |
| 2013/0266173 | A1 | 10/2013 | Niedermann | |
| 2013/0279730 | A1 | 10/2013 | Tanaka | |
| 2013/0329927 | A1 | 12/2013 | Samarakoon | |
| 2014/0294219 | A1 | 10/2014 | Powell | |

FOREIGN PATENT DOCUMENTS

| | | | |
|---|---|---|---|
| EP | 1937030 | A1 | 12/2006 |
| EP | 1937030 | A1 | 6/2008 |
| EP | 2282553 | A2 | 2/2011 |
| EP | 2574081 | A2 | 3/2013 |
| GB | 2349037 | A | 4/2000 |
| GB | 2349037 | A | 10/2000 |
| GB | 2352924 | A | 2/2001 |
| KR | 10-2003-0062955 | A | 7/2003 |
| KR | 1020110010999 | A | 2/2011 |
| KR | 10-2011-0058338 | A | 6/2011 |
| WO | 2006104101 | A1 | 10/2006 |

ELECTRONIC DEVICE

This is a Continuation of U.S. patent application Ser. No. 17/702,538, filed Mar. 23, 2033, which is a Continuation of U.S. patent application Ser. No. 17/106,664, filed on Nov. 30, 2020, which is a continuation of U.S. patent application Ser. No. 16/378,112 filed on Apr. 8, 2019, now U.S. Pat. No. 10,959,000, which is a Continuation of application Ser. No. 16/013,738 filed Jun. 20, 2018, now U.S. Pat. No. 10,299, 022, which is a Continuation of application Ser. No. 14/614, 021 filed Feb. 4, 2015, now U.S. Pat. No. 10,028,044, which claims the benefit of foreign priority to Korean Application No. 10-2014-0014385, filed Feb. 7, 2014, all of which are incorporated by reference in their entirety herein.

BACKGROUND OF THE INVENTION

Field of the Invention

The present invention relates to an electronic device and, more particularly, to an electronic device in which a speaker assembly can be configured without being limited to the size of a casing.

Discussion of the Related Art

As an electronic device, such as TV, a personal computer, a laptop, or a handheld phone, has diverse functions, it is implemented in the form of a multimedia player equipped with complex functions, such as the photographing of photos or moving pictures, the playback of music or moving image files, game, and the reception of broadcasting.

An electronic device may be divided into a mobile terminal and a stationary terminal depending on whether it is movable. The mobile terminal may be divided into a handheld terminal and a vehicle mount terminal depending on whether a user can directly carry the mobile terminal.

In order to support and increase the functions of the electronic device, to improve a structural part and/or software part of the electronic device is being taken into consideration.

SUMMARY OF THE INVENTION

An object of the present invention is to provide an electronic device in which speaker assembly can be configured without being limited to the size of a casing.

In accordance with an aspect of the present invention, an electronic device includes a body, a display combined with the front of the body, and a speaker assembly embedded on at least one side of the body. The speaker assembly may include a casing configured to form an external appearance and a speaker unit combined with the casing and configured to have at least part of an element of the speaker assembly exposed to an outside of the casing.

The speaker assembly may include at least one of cone paper, a frame outside the cone paper, and a magnet configured to operate in response to an electrical signal. The element may include at least one of the cone paper, the frame, and the magnet.

The diameter of the element may be substantially identical with the external diameter of the casing.

The casing may include a resonant region to which a sound generated by the speaker unit is delivered. At least part of the speaker unit may communicate with the inlet of the resonant region.

The casing may further include a spread hole provided on one side of the resonant region and configured to provide a path through which the sound passing through the resonant region is discharged to the outside of the casing.

The spread hole may be formed in the casing in a direction substantially identical with the direction of a cone paper of the speaker assembly.

The electronic device may further include a cushion provided in at least one of surfaces in which the casing is adjacent to the body and configured to have the casing and the body from having a direct contact with each other.

The electronic device according to an embodiment of the present invention is advantageous in that the speaker assembly can be configured without being limited by the size of the casing.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention

DETAILED DESCRIPTION OF THE EMBODIMENTS

Figure 1:
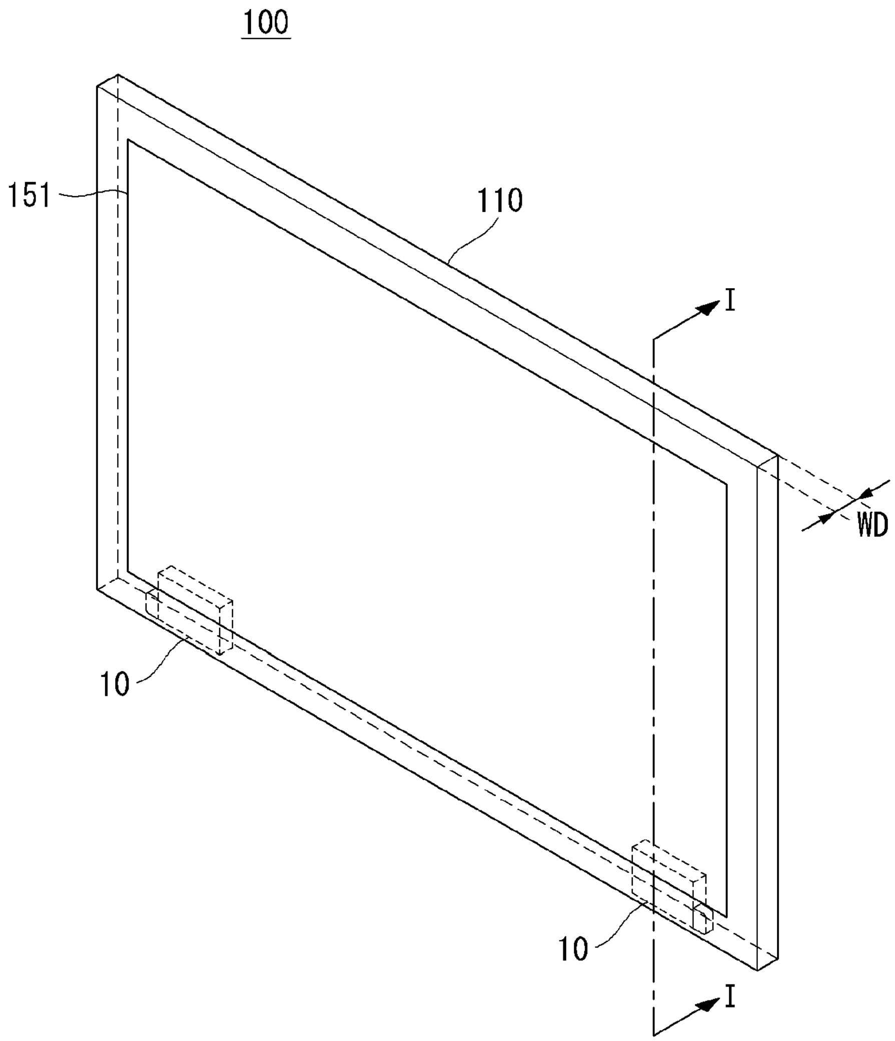
FIG. 1 is a perspective view of an electronic device in accordance with an embodiment of the present invention.

The above object, characteristics, and merits of the present invention will become more apparent from the following detailed description taken in conjunction with the accompanying drawings. The present invention may be modified in various ways and may have some embodiments. Hereinafter, some exemplary embodiments of the present invention will be illustrated in the accompanying drawings and described in detail. The same reference numerals basically designate the same elements throughout the drawings. Furthermore, a detailed description of known functions or elements relating to the present invention will be omitted if it is deemed to make the gist of the present invention unnecessarily vague. Numbers (for example, the first and the second) used to describe the present invention are merely identification symbols for distinguishing one element from the other element.

Hereinafter, an electronic device related to the present invention is described in more detail with reference to the accompanying drawings. It is to be noted that the suffixes of the elements used in the following description, such as "module" and "unit," are assigned or interchangeable with each other by taking only the easiness of writing this specification into consideration, but in themselves are not particularly given importance and roles.

FIG. 1 is a perspective view of an electronic device in accordance with an embodiment of the present invention.

As illustrated in FIG. 1, the electronic device 100 in accordance with an embodiment of the present invention may include a body 110 and a display 151 combined with the front of the body 110.

The body 110 may be a part that forms an external appearance of the electronic device 100. If the electronic device 100 is a display device, the body 110 may include a bezel, that is, the outer circumference of the display 151. The body 110 may have a minimized thickness. That is, this means that a body thickness WD, that is, the thickness of the body 110, gradually becomes thin as an electronic device becomes slim.

A speaker assembly 10 may be placed on at least one side of the body 110. For example, the speaker assembly 10 may be placed on the lower side of the body 110. A plurality of the speaker assemblies 10 may be spaced apart from each other at a specific interval.

The speaker assembly 10 may have a base reflex type (i.e., a closed box type) which may have a relatively thin thickness. That is, this means that the thickness of the speaker assembly 10 may become thin as the thickness of the electronic device 100 becomes thin as described above.

Performance of the speaker assembly 10 may be represented in sound pressure. That is, if the speaker assembly 10 generates high sound pressure, it may mean that it has excellent performance. Sound pressure may be proportional to the magnetic flux density of a magnet (16 of FIG. 2) that forms the speaker assembly 10. The magnetic flux density of the magnet (16 of FIG. 2) may be proportional to the size of the magnet (16 of FIG. 2). That is, this means that the speaker assembly 10 may have improved performance as the size the magnet (16 of FIG. 2) increases.

To improve the performance of the speaker assembly 10 may be limited by the body thickness WD of the body 110. That is, this means that the size of the speaker assembly 10 may be limited due to the body 110 that becomes slim as described above. This may limit the size of the magnet (16 of FIG. 2). The speaker assembly 10in accordance with an embodiment of the present invention can minimize the limit. That is, this means specific performance can be secured despite the slim body 110 by optimizing the utilization of the space.

Figure 2:
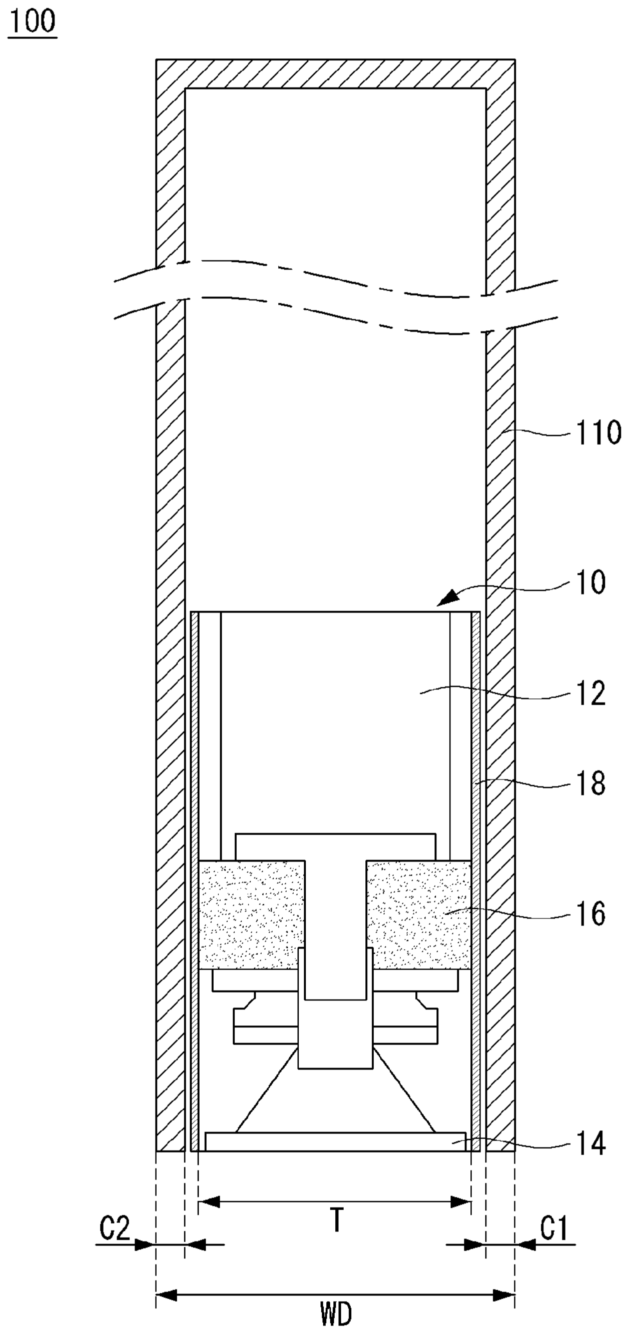
FIG. 2 is a cross-sectional view of line I-I in the electronic device of FIG. 1.

FIG. 2 is a cross-sectional view of line I-I in the electronic device of FIG. 1.

As illustrated in FIG. 2, the electronic device 100 in accordance with an embodiment of the present invention may include the speaker assembly 10 inside the body 110. For example, this means that the speaker unit 14 of the speaker assembly 10 may be downward placed at the bottom of the body 110. In such a state, a sound generated by the speaker unit 14 may be spread to the lower side of the electronic device 100 and delivered to a user.

A speaker assembly thickness T, that is, the thickness of the speaker assembly 10, may be smaller than the body thickness WD. That is, this means that a thickness obtained by subtracting casing thicknesses C1 and C2 and the thickness of a cushion 18 from the body thickness WD may be a pure speaker assembly thickness T. The speaker unit 14 may be placed inside the body 110 for a design reason. Accordingly, the size of the speaker unit 14 may be limited by the body thickness WD.

The casing thicknesses C1 and C2 may be determined by taking into consideration the entire stiffness of the electronic device 100. The casing thicknesses C1 and C2 do not need to be uniform in the entire electronic device 100. In this case, the casing thicknesses C1 and C2 may require stiffness. Accordingly, the size of the speaker unit 14 may be limited by the casing thicknesses C1 and C2.

The cushion 18 may be combined with the outside of the speaker assembly 10. The cushion 18 may be combined with both sides in which the speaker assembly 10 comes in contact with the casing 12. The speaker assembly 10 may vibrate in response to an operation. That is, this means that the speaker assembly 10 may vibrate to some extent in a process of generating a sound. The cushion 18 may be used to prevent a phenomenon in which the casing 12 is shaken due to the vibration of the speaker assembly 10.

The cushion 18 may be made of materials having specific elasticity. The cushion 18 may be made of rubber or sponge.

The magnet 16 may be placed in the rear of the speaker unit 14. The magnet 16 may generate an electromagnetic force in response to an electrical signal. The speaker unit 14 may generate a sound due to vibration attributable to the electromagnetic force generated by the magnet 16.

The magnet 16 operates based on the electromagnetic force the electrical signal as described above. Accordingly, the size of the magnet 16 and the amount of the electromagnetic force may have a specific correlation. The sound pressure of the speaker assembly 10 may be increased in proportion to the size of the magnet 16.

The magnet 16 may be substantially the same as the speaker assembly thickness T, that is, the thickness of the speaker assembly 10. That is, this means that in the speaker assembly 10 in accordance with an embodiment of the present invention, the magnet 16 may be configured to be substantially the same as the outside thickness of the speaker assembly 10 by increasing space utilization irrespective of the thickness of the casing 12 that forms the speaker assembly 10. The magnet 16 may be configured as great as possible because it can be configured irrespective of the thickness of the casing 12 that forms the speaker assembly 10.

Figure 3:
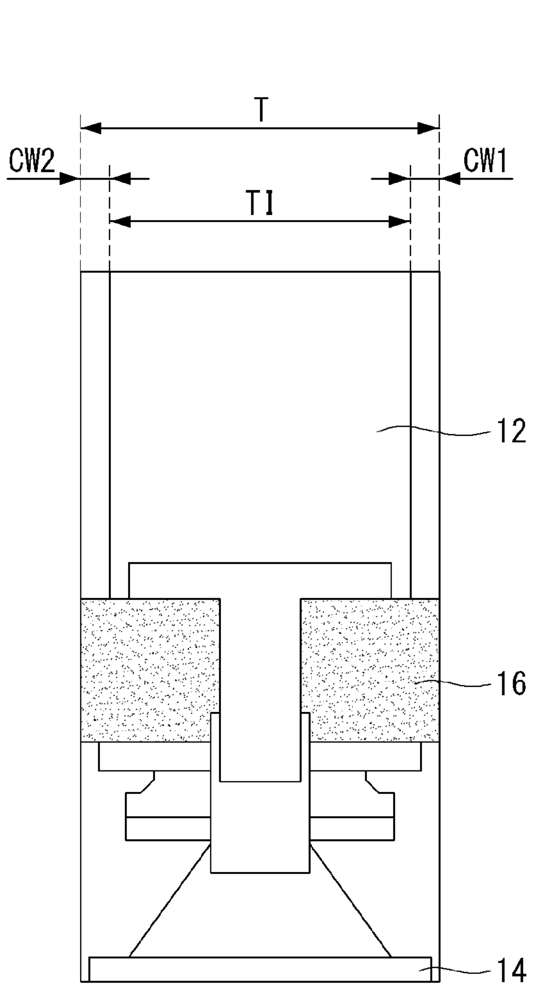
FIG. 3 illustrates the speaker assembly of the electronic device of FIG. 1.

FIG. 3 illustrates the speaker assembly of the electronic device of FIG. 1.

As illustrated in FIG. 3, the speaker assembly 10 in accordance with an embodiment of the present invention may include the magnet 16 having substantially the same thickness as the speaker assembly thickness T.

In order for the width of the magnet 16 to be substantially the same as the thickness of the speaker assembly 10, the casing 12 may have been removed from a part that belongs to the speaker assembly 10 and that corresponds to the magnet 16. Accordingly, the magnet 16 may be increased by CW1 and CW2, that is, the thicknesses of the casing 12. This may be clearly understood when considering that the magnet 16 may have a thickness of about TI if the casing 12 is present.

Figure 4:
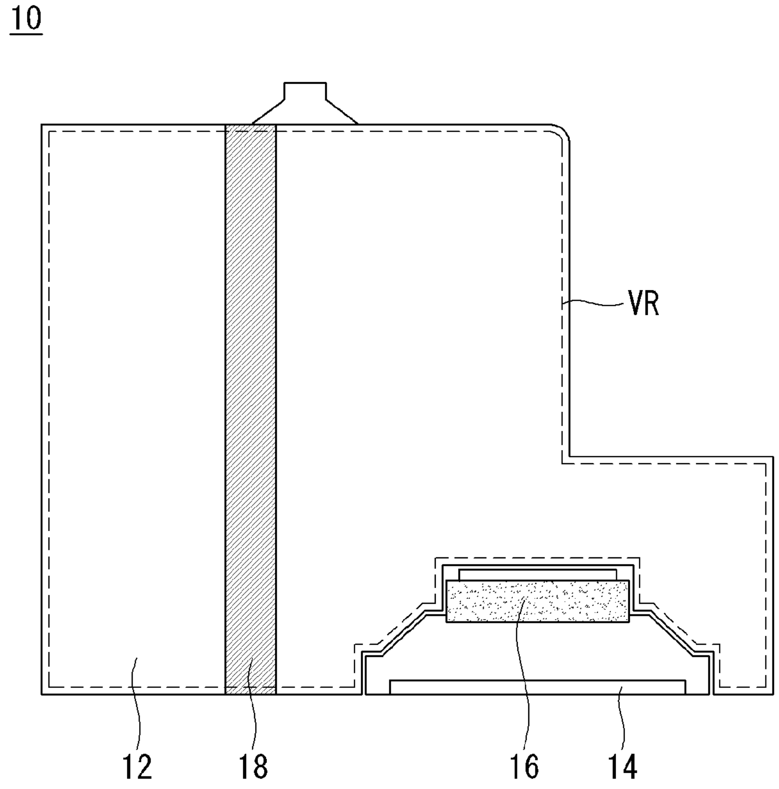
FIG. 4 is a side view of the speaker assembly of FIG. 3.

The rear of the speaker unit 14 of the casing 12 may function as a resonant region (VR of FIG. 4). That is, this means that a space in which a sound generated by the speaker unit 14 is amplified and/or spread may have been provided.

FIG. 4 is a side view of the speaker assembly of FIG. 3.

As illustrated in FIG. 4, in the speaker assembly 10 in accordance with an embodiment of the present invention, the magnet 16 may be externally exposed.

The speaker unit 14 may be placed on one side of the speaker assembly 10. The magnet 16 of the speaker unit 14 may be exposed to the outside of the casing 12. Heat generated from the magnet 16 can be easily spread to the outside because the magnet 16 is externally exposed. Accordingly, a phenomenon in which the casing 12 is deformed by the heat generated from the magnet 16 can be prevented.

The size of the magnet 16 can be maximized within a limited space because the casing 12 covering the magnet 16 is removed and the magnet 16 can be increased that much. Furthermore, a cost for materials corresponding to the removed part of the casing 12 can be reduced. The resonant region VR may be provided in the rear of the speaker assembly 10.

The resonant region VR may be at least some region within the casing 12. The resonant region VR may be a state in which at least some of the inside of the casing 12 is empty.

The resonant region VR may communicate with the speaker unit 14. A sound generated by the speaker unit 14 may be amplified and spread through the resonant region VR configured to communicate with the speaker unit 14.

The cushion 18 may be combined with the outside of the casing 12. The cushion 18 may prevent vibration attributable to the operation of the speaker assembly 10 from being delivered to the body 110 of the electronic device 100. The cushion 18 may be combined with both sides of the casing 12 that comes in contact with the body 110.

Figure 5:
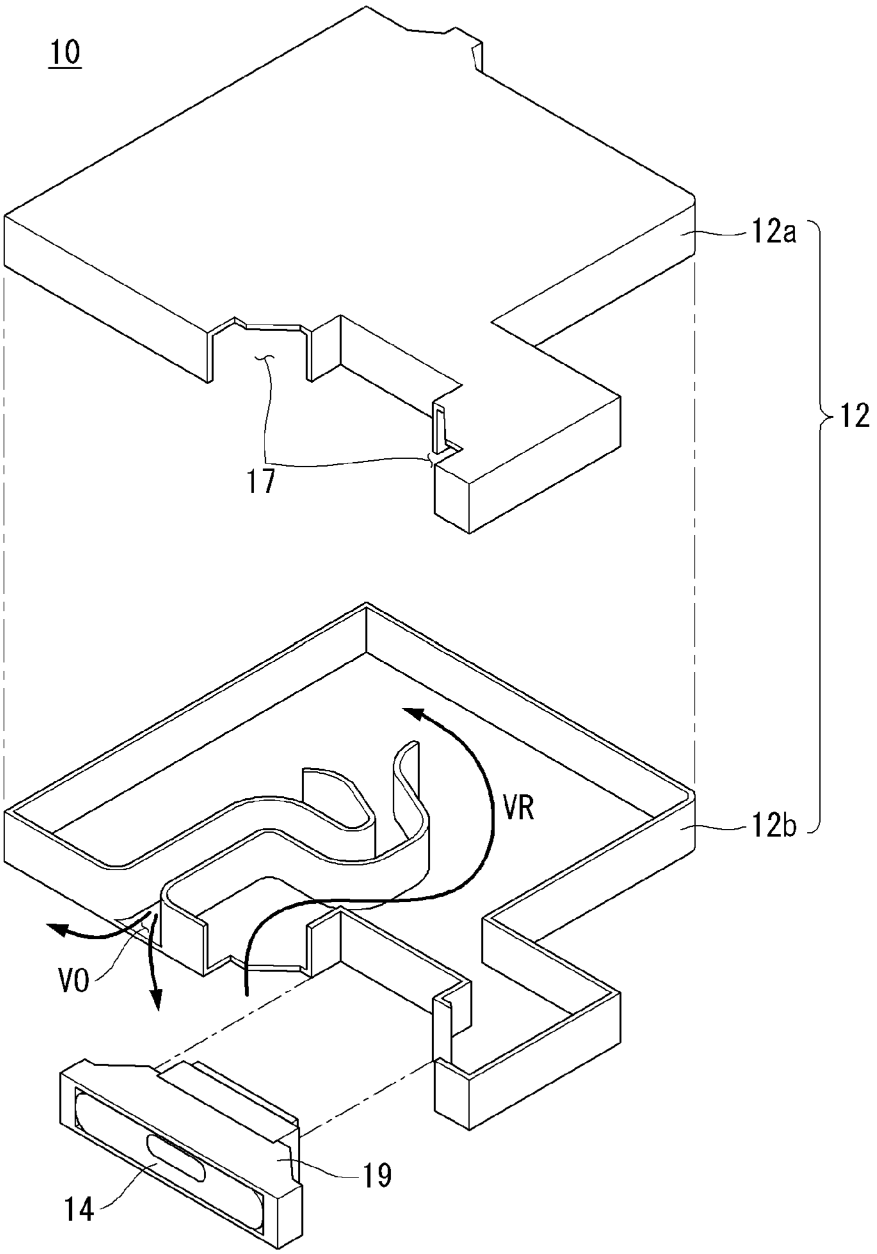
FIG. 5 is an exploded view of the speaker assembly of FIG. 3.

FIG. 5 is an exploded view of the speaker assembly of FIG. 3.

As illustrated in FIG. 5, in the speaker assembly 10 in accordance with an embodiment of the present invention, a part of the speaker unit 14 may communicate with the resonant region VR.

The speaker assembly 10 may include a first casing 12*a* and a second casing 12*b*. The first and the second casings 12*a* and 12*b* may be combined to form the casing 12. The inside of the casing 12 may be empty in a specific form because the first and the second casings 12*a* and 12*b* are combined. The empty internal space of the casing 12 may form the resonant region VR.

The resonant region VR may communicate with some region of the speaker unit 14. For example, a frame outside cone paper that forms the speaker unit 14 may be combined with through holes 17. Accordingly, a sound attributable to the operation of the speaker unit 14 may be spread to the inside of the resonant region VR through the through holes 17. The sound spread through the through holes 17 may pass through the resonant region VR and may be spread to the outside of the speaker assembly 10 through aspread hole VO.

In the aforementioned embodiment, an example in which the magnet 16 of the elements of the speaker assembly 10 has been exposed to the outside of the casing 12 has been described. In some embodiments, however, another part of the speaker assembly 10 may be exposed to the outside of the casing 12. For example, the cone paper that forms the speaker unit 14 and/or a frame outside the cone paper may be exposed to the outside of the casing 12. That is, this means that the present invention may be applied to an element whose size is limited by the casing 12 in the speaker unit 14.

The present invention is not limited to the aforementioned embodiments, and it is evident to those skilled in the art that the present invention may be modified and changed in various ways without departing from the spirit and of the scope present invention. Accordingly, those changes and modifications should be construed as belonging to the scope of the present invention.

What is claimed is:

1. An electronic device comprising:

a body;

a display in front of the body; and a speaker assembly disposed inside the body, wherein the speaker assembly including:

a casing forming an external appearance and including an internal space, the internal space providing a resonant region; and a speaker unit mounted on the casing, wherein the speaker unit comprises a magnet including a first large surface, a second large surface opposite the first large surface, a first small surface between the first large surface and the second large surface, and a second small surface opposite the first small surface, wherein the first small surface and the second small surface of the magnet are covered by the casing with the first large surface and the second large surface of the magnet being externally exposed from the speaker assembly, wherein the casing further includes a first through hole and a second through hole opposite the first through hole with respect to the speaker unit such that the speaker unit communicates with the internal space through the first through hole or the second through hole, wherein the casing comprises an outer side including a first outer side, a second outer side connected with the first outer side, and a third outer side connected with the second outer side, wherein the first outer side faces the third outer side, wherein the first outer side faces the first small surface of the magnet, and the third outer side faces the second small surface of the magnet, wherein the first through hole is disposed adjacent to the first outer side of the casing and inclined with respect to the first outer side of the casing, and wherein the second through hole is disposed adjacent to the third outer side of the casing and inclined with respect to the third outer side of the casing.

2. The electronic device of claim 1, wherein the magnet further includes a lower surface connected with the first large surface, the second large surface, the first small surface, and the second small surface, and wherein the speaker unit further includes a frame disposed on the lower surface of the magnet.

3. The electronic device of claim 2, wherein the frame is disposed along a center axis of the casing.

4. The electronic device of claim 3, wherein the frame is disposed offset from a center axis of the casing.

5. The electronic device of claim 3, wherein the frame, and the magnet form a single unit.

6. The electronic device of claim 1, wherein the outer side of the casing corresponds to a shape of the magnet to accommodate the magnet.

7. The electronic device of claim 1, wherein the speaker unit communicates with the internal space of the casing through the first through hole and the second through hole.

8. The electronic device of claim 1, wherein the casing further includes an inlet hole in the internal space and an outlet hole in communication with the inlet hole through a path.

9. The electronic device of claim 8, wherein the outlet hole faces toward an outside of the casing in order to spread sound from the speaker unit toward the outside of the casing.

10. The electronic device of claim 8, wherein the casing further comprises at least one wall within the internal space of the casing and the at least one wall forms the path where the inlet hole of the casing communicates with the outlet hole of the casing.

11. The electronic device of claim 1, wherein the casing is formed by combining a first casing part with a second casing part.

12. The electronic device of claim 1, wherein the speaker assembly is downwardly placed at the bottom of the body of the electronic device.

13. The electronic device of claim 1, wherein the speaker assembly further comprises a cushion, wherein the cushion is disposed at an outer surface of the casing of the speaker assembly.

14. The electronic device of claim 13, wherein the speaker assembly abuts two inner surfaces of the body of the electronic device with the cushion there between.

15. The display device of claim 1, wherein the first large surface of the magnet is substantially the same plane as a first outer surface of the casing and the second large surface of the magnet is substantially the same plane as a second outer surface of the casing, wherein the first outer surface of the casing is opposite the second outer surface of the casing.

16. The electronic device of claim 15, wherein a distance between the first large surface and the second large surface of the magnet is substantially identical to a distance between the first outer surface and the second outer surface of the casing.

17. The electronic device comprising:

a body;

a display in front of the body; and a speaker assembly inside the body, wherein the speaker assembly comprises:

a casing forming an external appearance and including an internal space providing a resonant region;

a speaker unit mounted on the casing, wherein the speaker unit comprises a magnet including a first large surface, a second large surface opposite the first large surface, a first small surface between the first large surface and the second large surface, and a second small surface opposite the first small surface, wherein the first small surface and the second small surface of the magnet are covered by the casing with the first large surface and the second large surface of the magnet being externally exposed from the speaker assembly, wherein an outer side of the casing corresponds to a shape of the magnet to accommodate the magnet, and wherein the casing further comprises at least one through hole adjacent to the outer side of the casing such that the speaker unit communicates with the internal space through the at least one through hole.

18. The electronic device of claim 17, wherein the magnet further includes:

a lower surface connected with the first large surface, the second large surface, the first small surface, and the second small surface, and wherein the speaker unit further includes a frame disposed on the lower surface of the magnet.

19. The electronic device of claim 17, wherein the casing further includes an inlet hole in the internal space and an outlet hole in communication with the inlet hole through a path.

20. The electronic device of claim 19, wherein the outlet hole faces toward an outside of the casing in order to spread sound from the speaker unit toward the outside of the casing.

21. The electronic device of claim 19, wherein the casing further comprises at least one wall within the internal space of the casing and the at least one wall forms the path where the inlet hole of the casing communicates with the outlet hole of the casing.

22. The electronic device of claim 17, wherein the outer side includes a first outer side, a second outer side connected with the first outer side, and a third outer side connected with the second outer side, wherein the first outer side faces the third outer side, wherein the first outer side faces the first small surface of the magnet, and the third outer side faces the second small surface of the magnet.

* * * * *